(12) United States Patent
Lee et al.

(10) Patent No.: US 8,697,308 B2
(45) Date of Patent: Apr. 15, 2014

(54) SOLID OXIDE ELECTROLYTE, SOLID OXIDE FUEL CELL INCLUDING THE SOLID OXIDE ELECTROLYTE, AND METHOD OF PREPARING THE SOLID OXIDE ELECTROLYTE

(75) Inventors: Sang-mock Lee, Yongin-si (KR); Hee-jung Park, Yongin-si (KR); Yong-ho Choa, Seongnam-si (KR); Chan Kwak, Yongin-si (KR)

(73) Assignees: Samsung Electronics Co., Ltd. (KR); Samsung SDI Co., Ltd. (KR); Industry-University Cooperation Foundation Hanyang University (KR)

( * ) Notice: Subject to any disclaimer, the term of this patent is extended or adjusted under 35 U.S.C. 154(b) by 451 days.

(21) Appl. No.: 13/048,401

(22) Filed: Mar. 15, 2011

(65) Prior Publication Data

US 2011/0294039 A1 Dec. 1, 2011

(30) Foreign Application Priority Data

May 27, 2010 (KR) .................. 10-2010-0049826

(51) Int. Cl.
- *H01M 8/10* (2006.01)
- *C04B 33/32* (2006.01)
- *H01M 8/12* (2006.01)

(52) U.S. Cl.
CPC ........................................ *H01M 8/126* (2013.01)
USPC ............................ 429/491; 429/495; 264/618

(58) Field of Classification Search
USPC .......... 429/491, 495; 252/62.2; 204/252, 295; 264/618
See application file for complete search history.

(56) References Cited

U.S. PATENT DOCUMENTS

2008/0248395 A1 10/2008 Harada et al.
2012/0171595 A1* 7/2012 Yamada et al. ............ 429/481

FOREIGN PATENT DOCUMENTS

| JP | 2002-134121 A | 5/2002 |
| JP | 2004-152646 A | 5/2004 |
| JP | 2006-344543 A | 12/2006 |
| KR | 1020040066118 A | 7/2004 |
| KR | 1020070095440 A | 9/2007 |

OTHER PUBLICATIONS

Atkinson et al., "Mechanical behaviour of ceramic oxygen ion-conducting membranes", Solid State Ionics, vol. 134, 2000, pp. 59-66.
Osamu Yamamoto, "Solid oxide fuel cells: fundamental aspects and prospects", Electrochimica Acta, vol. 45, 2000, pp. 2423-2435.
Park et al., "Defect-chemical role of Mn in Gd-doped CeO2", solid State Ionics, vol. 176, 2005, pp. 1485-1490.
Park et al., "The electrical conductivity and oxygen permeation of ceria with alumina addition at high temperature", Solid State Ionics, vol. 178, 2008, pp. 1746-1755.

* cited by examiner

*Primary Examiner* — Raymond Alejandro
(74) *Attorney, Agent, or Firm* — Cantor Colburn LLP

(57) ABSTRACT

A solid oxide electrolyte including an oxide represented by Formula 1:

$$(1-a-b)(Ce_{1-x}Ma_xO_{2-\delta}) + a(Mb) + b(Mc) \quad \text{Formula 1}$$

wherein
$0<a<0.2$, $0<b<0.2$, $0<x<0.5$, $\delta$ is selected so that the $Ce_{1-x}Ma_xO_{2-\delta}$ is electrically neutral,
Ma is a rare-earth metal,
Mb is an oxide, a nitride, or a carbide of aluminum (Al), silicon (Si), magnesium (Mg), or titanium (Ti), or a combination including at least one of the foregoing, and
Mc is an oxide of a metal of Groups 6 through 11.

15 Claims, 12 Drawing Sheets

FIG. 4
COMPARATIVE
SAMPLE 1
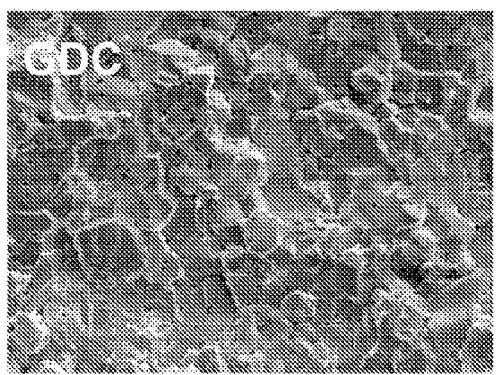
60 micrometers
SAMPLE 1
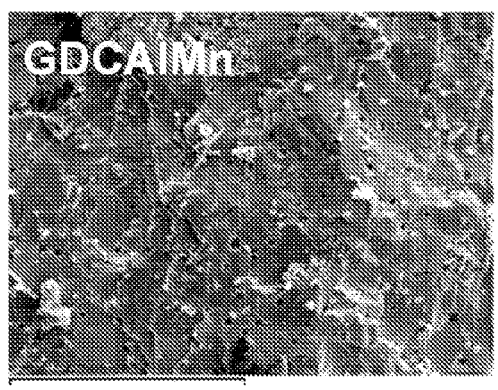
60 micrometers
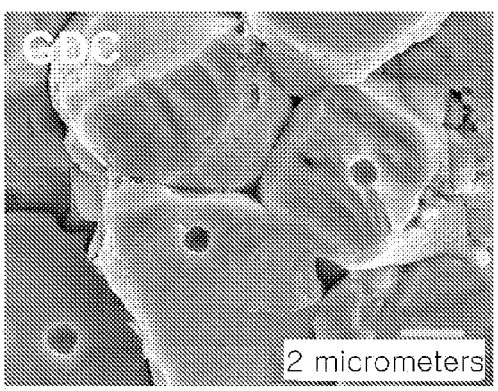
2 micrometers
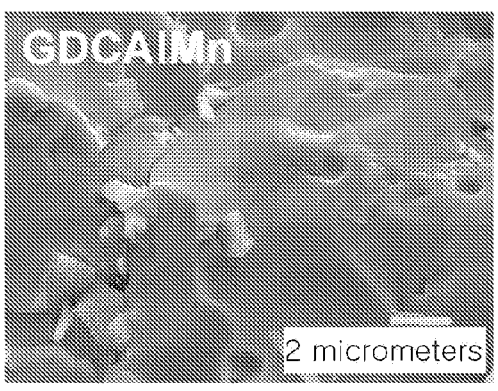
2 micrometers

US 8,697,308 B2

SOLID OXIDE ELECTROLYTE, SOLID OXIDE FUEL CELL INCLUDING THE SOLID OXIDE ELECTROLYTE, AND METHOD OF PREPARING THE SOLID OXIDE ELECTROLYTE

CROSS-REFERENCE TO RELATED APPLICATIONS

This application claims priority to Korean Patent Application No. 10-2010-0049826, filed on May 27, 2010, and all the benefits accruing therefrom under 35 U.S.C. §119, the content of which in its entirety is herein incorporated by reference.

BACKGROUND

1. Field

The present disclosure relates to solid oxide electrolytes, solid oxide fuel cells including the solid oxide electrolytes, and methods of preparing the solid oxide electrolytes.

2. Description of the Related Art

Fuel cells, which are an attractive alternative energy source, can be categorized as polymer electrolyte membrane fuel cells ("PEMFCs"), phosphoric acid fuel cells ("PAFCs"), molten carbonate fuel cells ("MCFCs"), and solid oxide fuel cells ("SOFCs"), according to a type of electrolyte used.

SOFCs electrochemically generate power in an environmentally friendly and highly efficient manner by directly converting the chemical energy of a fuel gas into electric energy. Compared to other types of fuel cells, SOFCs use relatively inexpensive materials, have a relatively high tolerance to fuel impurities, enable hybrid operation, and have high efficiency. In addition, because SOFCs can use hydrocarbon-based fuels without having to reform the fuels into hydrogen, a simple and inexpensive fuel cell system can be manufactured because an external reformer can be omitted.

An SOFC includes a negative electrode at which oxidization of, for example, hydrogen or a hydrocarbon occurs, a positive electrode at which oxygen gas is reduced into $O^{2-}$ ions, and a ceramic solid for conducting the $O^{2-}$ ions.

A commercially available SOFC operates at a high temperature, about 800 to about 1000° C., and thus high-temperature alloys or expensive ceramic materials, which are able to endure high temperature conditions, are used in the commercially available SOFC. In addition, due to the high-temperature operation, the commercially available SOFC has a long initial operating time, and the durability of materials used in manufacturing the commercially available SOFC is degraded. Furthermore, the commercially available SOFC is expensive, which is the largest obstacle for common-availability. Accordingly, much research into fuel cells operating at a temperature equal to or lower than 800° C. is being performed. The operating temperature of an SOFC is highly dependent upon the characteristics of an electrolyte used. A currently available electrolyte is an yttria-stabilized zirconia electrolyte and there are many efforts to replace the yttria-stabilized zirconia electrolyte with a doped ceria electrolyte that has high ionic conductivity even at a low temperature.

Even if the doped ceria electrolyte has high ionic conductivity, it also shows high electronic conductivity in a reducing environment, and thus, when used as a solid electrolyte of a fuel cell, a power-generation efficiency of the fuel cell may be degraded. Accordingly, there remains a need to develop a doped ceria electrolyte with improved power-generation efficiency, as well as high ionic conductivity.

SUMMARY

Provided is a solid oxide electrolyte having a novel structure, high ionic conductivity, and low electronic conductivity.

Provided is a method of preparing the solid oxide electrolyte.

Provided is a solid oxide fuel cell including the solid oxide electrolyte.

Additional aspects, features, and advantages will be set forth in part in the description which follows and, in part, will be apparent from the description.

According to an aspect, disclosed is a solid oxide electrolyte including: an oxide represented by Formula 1

$$(1-a-b)(Ce_{1-x}Ma_xO_{2-\delta})+a(Mb)+b(Mc)$$   Formula 1

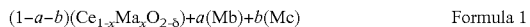

wherein 0<a<0.2, 0<b<0.2, 0<x<0.5, δ is selected so that the $Ce_{1-x}Ma_xO_{2-\delta}$ is electrically neutral, Ma is a rare-earth metal, Mb is an oxide, a nitride, or a carbide of aluminum (Al), silicon (Si), magnesium (Mg), or titanium (Ti), or a combination including at least one of the foregoing, and Mc is an oxide of a metal of Groups 6 through 11.

According to another aspect, a method of preparing a solid oxide electrolyte includes: contacting a cerium precursor, a precursor of Mb, a precursor of Mc, and a solvent to prepare a precursor composition; spraying the precursor composition; and calcining the sprayed precursor composition in an oxygen atmosphere to prepare the solid oxide electrolyte, wherein Mb is an oxide, a nitride, or a carbide of aluminum (Al), silicon (Si), magnesium (Mg), or titanium (Ti), or a combination including at least one of the foregoing, and Mc is an oxide of a metal of Groups 6 through 11.

According to another aspect, disclosed is a solid oxide fuel cell including: an air electrode, a fuel electrode; and the solid oxide electrolyte as described above interposed between the air electrode and the fuel electrode.

BRIEF DESCRIPTION OF THE DRAWINGS

These and/or other aspects will become apparent and more readily appreciated from the following description of the embodiments, taken in conjunction with the accompanying drawings in which:

FIG. 4 shows scanning electron microscope ("SEM") analysis results of sintered products prepared according to Example 1 and Comparative Example 1;

DETAILED DESCRIPTION

Figure 1:
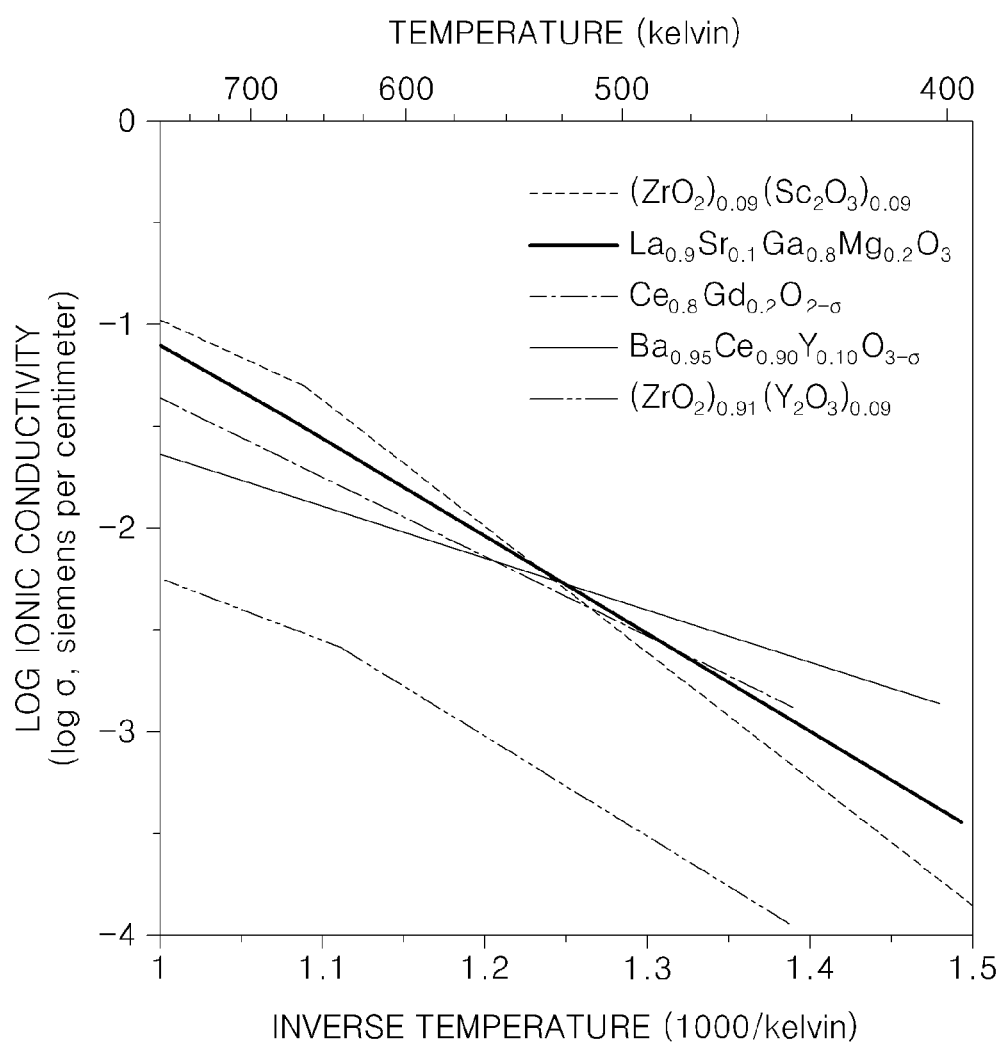
FIG. 1 is a graph of log ionic conductivity (log σ, siemens per centimeter, $Scm^{-1}$) versus temperature (Kelvin, K) and inverse temperature (1000/Kelvin) of various solid oxide electrolyte materials.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers, and/or sections should not be limited by these terms. These terms are only used to distinguish one element, component, region, layer, or section from another element, component, region, layer, or section. Thus, "a first element," "component," "region," "layer" or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, a solid oxide electrolyte, a solid oxide fuel cell including the solid oxide electrolyte, and a method of preparing the solid oxide electrolyte will be disclosed in further detail.

A solid oxide electrolyte according to an embodiment may comprise a doped ceria solid oxide electrolyte represented by Formula 1:

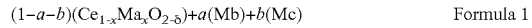

$$(1-a-b)(Ce_{1-x}Ma_xO_{2-\delta})+a(Mb)+b(Mc) \qquad \text{Formula 1}$$

Referring to Formula 1, $Ce_{1-x}Ma_xO_{2-\delta}$, which is a ceria compound, is a solid solution in which $CeO_2$ is doped with Ma as a dopant element.

$CeO_2$, i.e., pure ceria, has a cubic structure, and thus does not need to be stabilized. However, in $CeO_2$, $Ce^{4+}$ has a relatively large radius and thus various kinds of additives may be used to form a solid solution with $CeO_2$.

In Formula 1, Ma may be any element that is available in the art and has a smaller number of valence electrons than $Ce^{4+}$. While not wanting to be bound by theory, it is believed that when Ma is added to $CeO_2$, Ma induces formation of empty oxygen sites (i.e., oxygen vacancies) in the $CeO_2$ crystal lattice, and the resulting material may thus provide oxygen ion conductivity. For example, Ma may be a rare-earth metal. In this regard, the rare-earth metal may be scandium (Sc), yttrium (Y), or a lanthanide element, such as lanthanum (La). Also, Ma may be gadolinium (Gd), yttrium (Y), scandium (Sc), ytterbium (Yb), samarium (Sm), lutetium (Lu), dysprosium (Dy), lanthanum (La), or praseodymium (Pr). A combination comprising at least one of the foregoing may be used.

The doped ceria compound has higher ionic conductivity than a zirconia. Due to such high ionic conductivity, the doped ceria solid oxide electrolyte may be used in an intermediate temperature range, and thus may be used as a solid oxide electrolyte that is used at an intermediate temperature, for example, a temperature of about 300 to about 800° C., specifically about 400 to about 700° C., more specifically 500° C. However, at the intermediate temperature, the empty oxygen ion sites, which enable oxygen ion migration, may be electrostatically attracted to the additive ions that cause formation of the empty oxygen ion sites. Thus the empty oxygen ion sites (i.e., oxygen ion vacancies) may associate, degrading the oxygen ion conductivity. To prevent this degradation mechanism, a dopant having a relatively small attractive force may be used. Because electrostatic attraction is dependent upon the ionic radius of the added ions, a tri-valent ion having an ionic radius which is similar to that of $Ce^{4+}$ may be used. Examples of the tri-valent ion include Sm, Gd, Y, or La. A combination comprising at least one of the foregoing can be used.

In Formula 1, x is the amount of the dopant in the ceria compound and may satisfy, for example, any of the following inequalities: $0<x<0.5$, $0<x<0.3$, $0.10<x<0.25$, or $0.15<x<0.23$. If x is greater than 0 and smaller than 0.5, the solid oxide electrolyte may provide sufficient ionic conductivity. In addition, in Formula 1, δ is an oxygen vacancy content, and is selected so that the ceria compound is neutral, and may be x/2.

The solid oxide electrolyte prevents the disadvantages of a commercially available doped ceria solid oxide electrolyte, such as Gd-doped Ceria, ("GDC"). Specifically the solid oxide electrolyte inhibits an increase in electronic conductivity, which may occur in a reducing environment. The solid oxide electrolyte also has a ceria hetero-structure, which includes an electron trapping compound Mc, and a strength reinforcing compound Mb.

Hereinafter, an increase in the electronic conductivity of a commercially available doped ceria compound in a reducing environment, and the resulting disadvantages, will be described in further detail. This description is provided only to help the understanding of those of ordinary skill in the art, and shall not limit the scope of the present disclosure.

FIG. 1 is a graph illustrating the ionic conductivity of various solid oxide electrolyte materials. Referring to FIG. 1, a doped ceria solid oxide electrolyte, specifically GDC, has higher ionic conductivity than a commercially available solid oxide electrolyte, specifically yttria stabilized zirconia ("YSZ") by at least one order of magnitude. Thus, the doped ceria solid oxide electrolyte, e.g., GDC, may be a solid oxide electrolyte for low-temperature operation. However, use of the doped ceria solid oxide electrolyte, such as GDC, is limited due to its electronic conductivity, which occurs in a reducing environment (see FIG. 2).

When electronic conductivity occurs, output-power density of a fuel cell is reduced. An equilibrium potential ("E") open circuit voltage ("OCV") equation, which is related to the output-power density, is provided in Equation 1:

Equation 1

$$E = t_i \left(\frac{kT}{4q}\right) \ln(P_1/P_2) \quad (1)$$

wherein the ionic transference number $t_i = \sigma_{ion}/(\sigma_{ion} + \sigma_{electron})$, wherein $0 \leq t_i \leq 1$. When the electronic conductivity is substantially lower than the ionic conductivity, the ionic transference number may be 1 and the OCV may be dependent upon the oxygen partial pressure P1 of the positive electrode and the oxygen partial pressure P2 of the fuel (i.e., negative) electrode at an opposite end of the electrolyte. However, if the ionic transference number is smaller than 1, the OCV may not have a theoretical value that is determined by using only the oxygen partial pressures P1 and P2 of the positive electrode and the fuel electrode, respectively. This is the case for the doped ceria solid oxide electrolyte. The doped ceria solid oxide electrolyte, as further disclosed above, has high ionic conductivity in an air atmosphere (see FIG. 1). However, when the oxygen partial pressures are lowered, electronic conductivity occurs and the ionic transference number becomes smaller than 1, and ultimately the OCV is smaller than the theoretical value (see FIG. 2).

Figure 2:
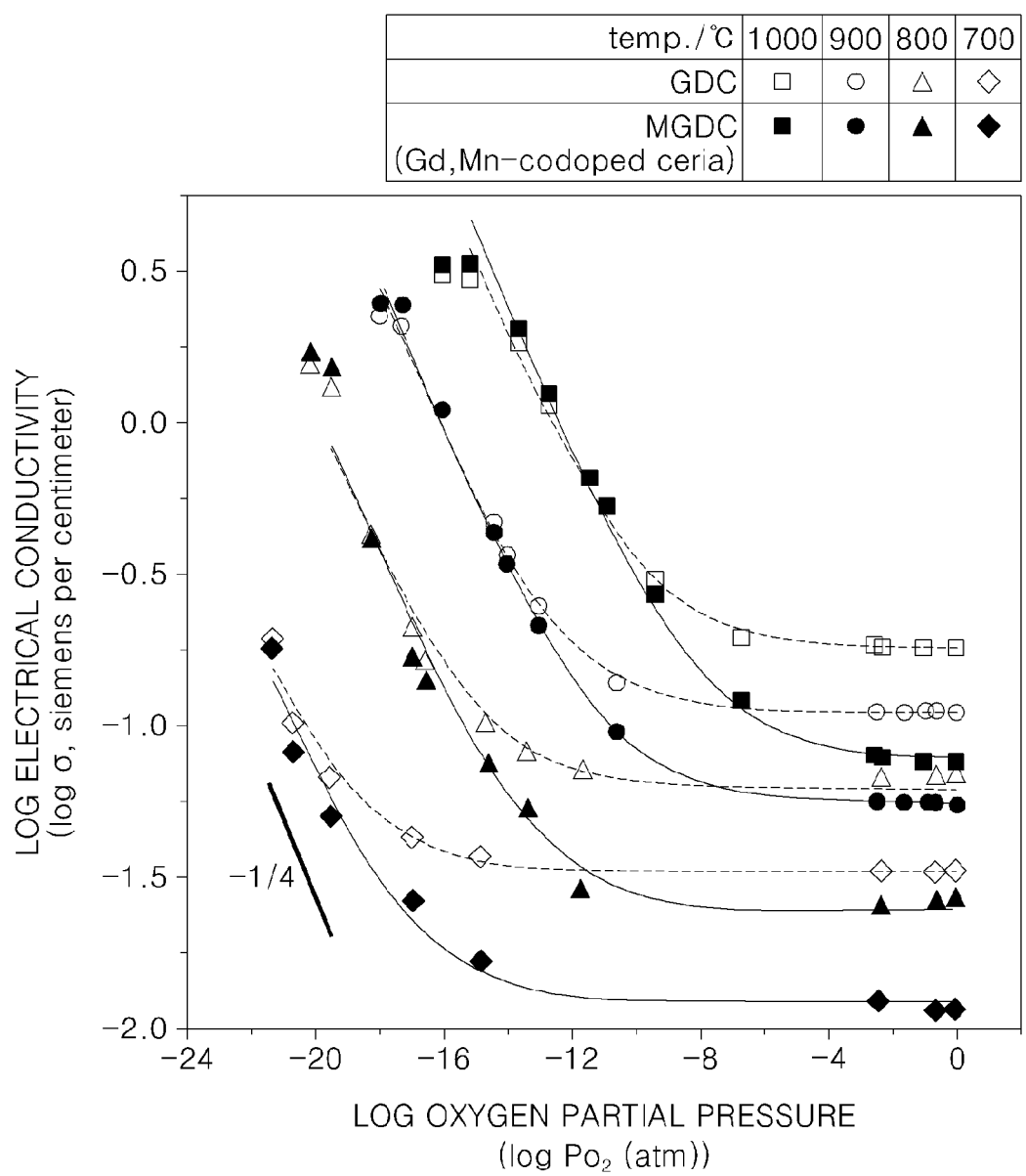
FIG. 2 is a graph of log electronic conductivity (log σ, siemens per centimeter, $Scm^{-1}$) of the doped ceria solid oxide electrolyte Gd-doped Ceria ("GDC"), and a doped ceria solid oxide electrolyte, with respect to the log of oxygen partial pressure ( )

Specifically, referring to FIG. 2, if hydrogen is used as a fuel for a fuel cell at a temperature of about 700° C., an oxygen partial pressure ($P_{O2}(a_{O2})$) of a fuel electrode may be about $10^{-23}$ atmospheres ("atm"). In this environment, electronic conductivity is about ten times the ionic conductivity (the conductivity of the doped ceria solid oxide electrolyte GDC in an air atmosphere is essentially the ionic conductivity, specifically the conductivity when log $P_{O2}$ is −0.67), and thus, the ionic transference number is about 0.1. Thus, when GDC is used as a solid oxide electrolyte of a fuel cell, 90% of the OCV is lost due to electronic conductivity in the fuel cell. The loss of OCV leads to low output-power, which is a general phenomenon of a doped ceria material. Accordingly, when GDC is used as a solid oxide electrolyte, electronic conduction would be desirably suppressed to improve power-generation efficiency.

Accordingly, the solid oxide electrolyte according to an embodiment includes the electron trapping compound Mc to suppress an increase in electronic conductivity in a reducing environment.

The electron trapping compound Mc may be an oxide of a metal of Groups 6 through 11. For example, the electron trapping compound Mc may be an oxide of a metal of Groups 7, 8, or 11, for example, an oxide of a metal of chromium (Cr), manganese (Mn), iron (Fe), cobalt (Co), nickel (Ni), or copper (Cu). For example, the electron trapping compound (Mc) may include, but is not limited thereto, an oxide of $Mn_2O_3$, MnO, $Fe_2O_3$, FeO, $Cu_2O_3$, CuO, $CO_2O_3$, or NiO. The electron trapping compound (Mc) may be any compound that suppresses electronic conduction when added to a doped ceria compound and is available in the art.

In an embodiment, a reduction potential energy of an ion of a metal of Groups 6 through 11 in the electron trapping compound Mc is smaller than a reduction potential energy for changing $Ce^{4+}$ into $Ce^{3+}$ in the doped ceria compound. Thus, the electron trapping compound Mc traps electrons in a reducing environment to suppress high electronic conductivity of the doped ceria solid oxide electrolyte.

In Formula 1, b is a content of the electron trapping compound Mc, and may satisfy, for example, any of the following inequalities: $0<b<0.2$, $0<b<0.1$, $0.005<b<0.07$, or $0.007<b<0.05$. If b is greater than 0 and smaller than 0.2, the inclusion of the electron trapping compound Mc may result in suppression of electronic conductivity, and thus, a fuel cell electrolyte with a high output-power density may be provided.

In addition, a solid oxide electrolyte according to an embodiment includes Mb, which is a strength reinforcing compound. When $Ce^{4+}$ is reduced, the electronic conductivity of the solid oxide electrolyte may be increased, and also mechanical properties of the solid oxide electrolyte may be degraded. While not wanting to be bound by theory, it is believed that these changes may be due to expansion of a fluorite structure of the doped ceria compound, resulting from increasing lattice parameters.

Accordingly, the strength reinforcing compound Mb may substantially or effectively prevent a decrease in mechanical properties when electronic conduction occurs in the solid oxide electrolyte.

Examples of the strength reinforcing compound Mb include an oxide, a nitride, or a carbide of a metal of aluminum (Al), silicon (Si), magnesium (Mg), or titanium (Ti). A combination comprising at least one of the foregoing can be used.

For example, the strength reinforcing compound Mb may include at least one of $Al_2O_3$, $SiO_2$, MgO, $TiO_2$, AlN, SiC, or $Si_3N_4$. However, the strength reinforcing compound Mb shall not be limited to the foregoing materials, and may be any compound that improves mechanical properties of the doped ceria compound when added and is available in the art.

In Formula 1, a is a content of the strength reinforcing compound Mb and may satisfy, for example, any of the following inequalities: $0<a<0.2$, $0<a<0.1$, $0.005<a<0.07$, or $0.007<a<0.05$. If a is greater than 0 and smaller than 0.2, the inclusion of the strength reinforcing compound may lead to a solid oxide electrolyte with high strength while sustaining electronic conductivity.

A solid oxide electrolyte according to another embodiment may be represented by Formula 2 below:

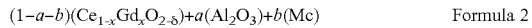

$$(1-a-b)(Ce_{1-x}Gd_xO_{2-\delta})+a(Al_2O_3)+b(Mc) \quad \text{Formula 2}$$

wherein

Mc is $Mn_2O_3$, CuO, or $Fe_2O_3$, $0<a<0.1$, $0<b<0.1$, $0<x<0.3$, and $\delta$ is a value selected so that $Ce_{1-x}Gd_xO_{2-\delta}$ is electrically neutral.

For example, in Formula 2, $0.005<a<0.07$, $0.005<b<0.07$, and $0.10<x<0.25$, or $0.007<a<0.05$, $0.007<b<0.05$, and $0.15<x<0.23$.

A method of preparing the solid oxide electrolyte according to an embodiment includes contacting a cerium precursor, a precursor of Mb, a precursor of Mc, and a solvent to prepare a precursor composition; spraying the precursor composition; and calcining the precursor composition in an oxygen atmosphere to prepare the solid oxide electrolyte, wherein Mb is an oxide, a nitride, or a carbide of a metal of aluminum (Al), silicon (Si), magnesium (Mg), or titanium (Ti), and Mc is an oxide of a metal of Groups 6 through 11.

The Groups 6 through 11 metals may include Cr, Mn, Fe, Co, Ni, or Cu. A combination comprising at least one of the foregoing can be used.

The solvent may be any solvent that is used in the art, and may be, for example, water or ethanol.

The cerium precursor, the precursor of Mb, and the precursor of Mc may each independently be an aqueous composition. For example, the cerium precursor may be a cerium nitrate or acetate, the precursor of Mb may be a nitrate or acetate of Mb, and the precursor of Mc may be a nitrate or acetate of Mc.

For example, the cerium precursor may be a cerium nitrate, the precursor of Mb (the strength reinforcing compound) may be a nitrate of a metal of aluminum (Al), silicon (Si), magnesium (Mg), or titanium (Ti), and the precursor of Mc (the electron trapping compound) may be a nitrate of a metal of Groups 6 through 11.

The contacting method may include mechanical mixing or ultrasonically mixing. However, the mixing method is not limited thereto. For example, any method that is used in the art may be used for the mixing.

The spraying of the precursor composition may be performed using an ultrasonic spray. However, the spraying method is not limited thereto. For example, any spraying method that is used in the art may be used for the spraying.

A carrier gas for delivering the sprayed precursor composition may be oxygen gas, but is not limited thereto. For example, the carrier gas may be any gas that enables formation of an oxide, specifically only an oxide, during the calcination process.

The calcining of the precursor composition may be performed at a temperature of about 600 to about 1100° C., specifically about 700 to about 1000° C., more specifically about 800 to about 900° C. However, the calcination temperature is not limited thereto and may be appropriately selected. For example, a cerium precursor, a precursor of a strength reinforcing compound Mb, and a precursor of an electron trapping oxide Mc may be contacted in pure water to prepare a precursor composition. Then, the precursor composition may be sprayed in the form of droplets, e.g., droplets of a solution, using an ultrasonic spray and loaded into a calcination furnace by a carrier oxygen gas. The calcination furnace may be controlled to have a temperature of about 600 to about 1100° C., specifically about 700 to about 1000° C., more specifically about 800 to about 900° C. The mixed gas is thermally decomposed in 0.1 to 100 seconds, specifically 1 to 50 seconds, more specifically within 10 seconds or less when passing through the calcination furnace, thereby producing a calcination product, which may be in the form of a powder. The calcination product formed by the thermal decomposition may be collected by a capturing device.

The preparation method disclosed above may further include sintering the calcination product to obtain a sintered product. The sintering may be performed at a temperature of about 600 to about 1800° C., specifically about 700 to about 1700° C., more specifically about 800° C. or more and at a pressure of 1 to 10 atmospheres (atm), specifically 2 to 5 atm, more specifically a pressure of 1 atm or higher. For example, the sintering may be performed at a temperature of about 800 to about 1700° C., specifically about 900 to about 1600° C., and at a pressure of about 1 atm to about 1 GPa, specifically about 0.01 GPa to about 1 GPa, more specifically about 0.1 to about 0.9 GPa.

In addition, in regard to the method of preparing the solid oxide electrolyte, a precursor of a rare-earth metal may be further included in addition to the cerium precursor, the precursor of Mb, and the precursor of Mc to prepare the precursor composition.

The rare-earth metal has a smaller number of valence electrons than $Ce^{4+}$, and, in the method of preparing the solid oxide electrolyte, may be added to a cerium oxide to form oxygen vacancies (i.e., empty oxygen sites) to provide oxygen ion conductivity. In this regard, the rare-earth metal may be a lanthanide element, such as lanthanum (La), scandium (Sc), or yttrium (Y). For example, the rare-earth metal may be Gd, Y, Sc, Yb, Sm Lu, Dy, La, or Pr. A combination comprising at least one of the foregoing can be used.

The precursor of the rare-earth metal may be a nitrate of the rare-earth metal.

A solid oxide fuel cell according to an embodiment includes an air electrode (i.e., a cathode or positive electrode), a fuel electrode (i.e., an anode or negative electrode), and the solid oxide electrolyte interposed between the air electrode and the fuel electrode.

The solid oxide fuel cell may have a stack structure comprising unit cells, each unit cell comprising a membrane electrode assembly ("MEA"). For example, each unit cell may include an air electrode, a fuel electrode, and a solid oxide electrolyte disposed in series. Also, a separator may be interposed between adjacent unit cells to electrically connect them, thereby forming a stack structure comprising unit cells.

The air electrode may comprise a metal oxide having a perovskite-type crystal structure. Examples of the metal oxide having the perovskite-type crystal structure include (Sm,Sr)CoO$_3$, (La,Sr)MnO$_3$, (La,Sr)CoO$_3$, (La,Sr)(Fe,Co)O$_3$, or (La,Sr)(Fe,Co,Ni)O$_3$. The metal oxides described above may be used alone or in combination. Alternatively, the air electrode may comprise platinum, ruthenium, or palladium. The air electrode may alternatively be lanthanum manganite doped with strontium, cobalt, or iron. Examples of the lanthanum manganite doped with strontium, cobalt, or iron include La$_{0.8}$Sr$_{0.2}$MnO$_3$ ("LSM"), or La$_{0.6}$Sr$_{0.4}$CO$_{0.8}$Fe$_{0.2}$O$_3$ ("LSCF").

The solid oxide electrolyte may be the above-disclosed solid oxide electrolyte, and may have high ionic conductivity, low electronic conductivity, and high mechanical strength according to an embodiment. In addition, the solid oxide electrolyte may further include a material which is used for preparing a commercially available solid oxide electrolyte. For example, the solid oxide electrolyte may further include a composite metal oxide including at least one material of zirconium oxide, cerium oxide, or lanthanum oxide. Examples of the zirconium oxide, the cerium oxide, and the lanthanum oxide include yttria stabilized zirconia ("YSZ"), scandia stabilized zirconia ("ScSZ"), samaria doped ceria ("SDC"), and gadolinia doped ceria ("GDC"). A thickness of the solid oxide electrolyte may be about 100 nanometers (nm) to about 1 mm, specifically about 500 nm to about 50 μm, more specifically about 1 μm to about 25

The fuel electrode may comprise a cermet including the material of the solid oxide electrolyte and a nickel oxide. The fuel electrode may further include an activated carbon.

The disclosed embodiments will be described in further detail with reference to the following examples. These examples are for illustrative purposes only and shall not limit the scope of this disclosure.

Example 1

Calcination Process

Cerium-nitrate (Ce(NO$_3$)$_3$,6H$_2$O), gadolinium-nitrate (Gd(NO$_3$)$_3$,6H$_2$O, aluminum-nitrate (Al(NO$_3$)$_3$,9H$_2$O), and manganese-nitrate (Mn(NO$_3$)$_2$,6H$_2$O) were added to 100 ml of ultra pure water or deionized water and dissolved by stirring to prepare a precursor solution. In this regard, amounts of cerium-nitrate (Ce(NO$_3$)$_3$,6H$_2$O), gadolinium-nitrate (Gd(NO$_3$)$_3$,6H$_2$O, aluminum-nitrate (Al(NO$_3$)$_3$,9H$_2$O), and manganese-nitrate (Mn(NO$_3$)$_2$,6H$_2$O) were controlled so as to obtain an electrolyte with a concentration of 0.2 molar (M) and a target composition ratio. The precursor solution was dispersed by using an ultrasonic spray and delivered into a calcination furnace by an oxygen carrier gas at a rate of 1.5 liters/minute. The temperature of the calcination furnace was 900° C. and the calcination furnace is divided into two temperature regions. The sprayed precursor solution was decomposed and calcined as it passed through the calcination furnace together with the carrier gas within 2 to 10 seconds, thereby producing a composite powder calcination product including 97 weight percent (weight %) of Ce$_{0.8}$Gd$_{0.2}$O$_2$, 2 weight % of Al$_2$O$_3$, and 1 weight % of Mn$_2$O$_3$, ("GDCAlMn").

Sintering Process

The composite powder including Ce$_{0.8}$Gd$_{0.2}$O$_2$, Al$_2$O$_3$, and Mn$_2$O$_3$ obtained in the calcination process was sintered using a spark plasma sintering ("SPS") device at a temperature of 1400° C. and at a pressure of 80 MPa, thereby producing a sintered product in the form of a pellet. A relative density of the sintered product was 93%. The sintered GDCAlMn product is referred to herein as Sample 1.

Example 2

Calcination Process

A calcination product was prepared in the same manner as in Example 1, except that iron nitrate (Fe(NO$_3$)$_2$,6H$_2$O) was used instead of manganese nitrate (Mn(NO$_3$)$_2$,6H$_2$O). The calcination product was a powder having a composition including 97 weight % of Ce$_{0.8}$Gd$_{0.2}$O$_2$, 2 weight % of Al$_2$O$_3$, and 1 weight % of Fe$_2$O$_3$.

Sintering Process

A sintered product was prepared in the same manner as in Example 1. A relative density of the sintered product was 92%. The sintered product is referred to herein as Sample 2.

Example 3

Calcination Process

A calcination product was prepared in the same manner as in Example 1, except that copper nitrate (Cu(NO$_3$)$_2$,6H$_2$O) was used instead of manganese nitrate (Mn(NO$_3$)$_2$,6H$_2$O). The calcination product was powder having a composition including 97 weight % of Ce$_{0.8}$Gd$_{0.2}$O$_2$, 2 weight % of Al$_2$O$_3$, and 1 weight % of CuO.

Sintering Process

A sintered product was prepared in the same manner as in Example 1. A relative density of the sintered product was 92%. The sintered product is referred to herein as Sample 3.

Comparative Example 1

Preparation of Ce$_{0.8}$Gd$_{0.2}$O$_2$

Calcination Process

A calcination product was prepared in the same manner as in Example 1, except that aluminum nitrate (Al(NO$_3$)$_3$,9H$_2$O) and manganese nitrate (Mn(NO$_3$)$_2$,6H$_2$O) were not used and only cerium nitrate (Ce(NO$_3$)$_3$,6H$_2$O) and gadolinium nitrate (Gd(NO$_3$)$_3$,6H$_2$O) were used. The obtained calcination product was Ce$_{0.8}$Gd$_{0.2}$O$_2$ powder.

Sintering Process

A sintered product was prepared in the same manner as in Example 1. A relative density of the sintered product was 93%. The sintered product, i.e., GDC, is referred to herein as Comparative Sample 1.

Characteristics Evaluation

X-ray Diffraction ("XRD") Test

Figure 3:
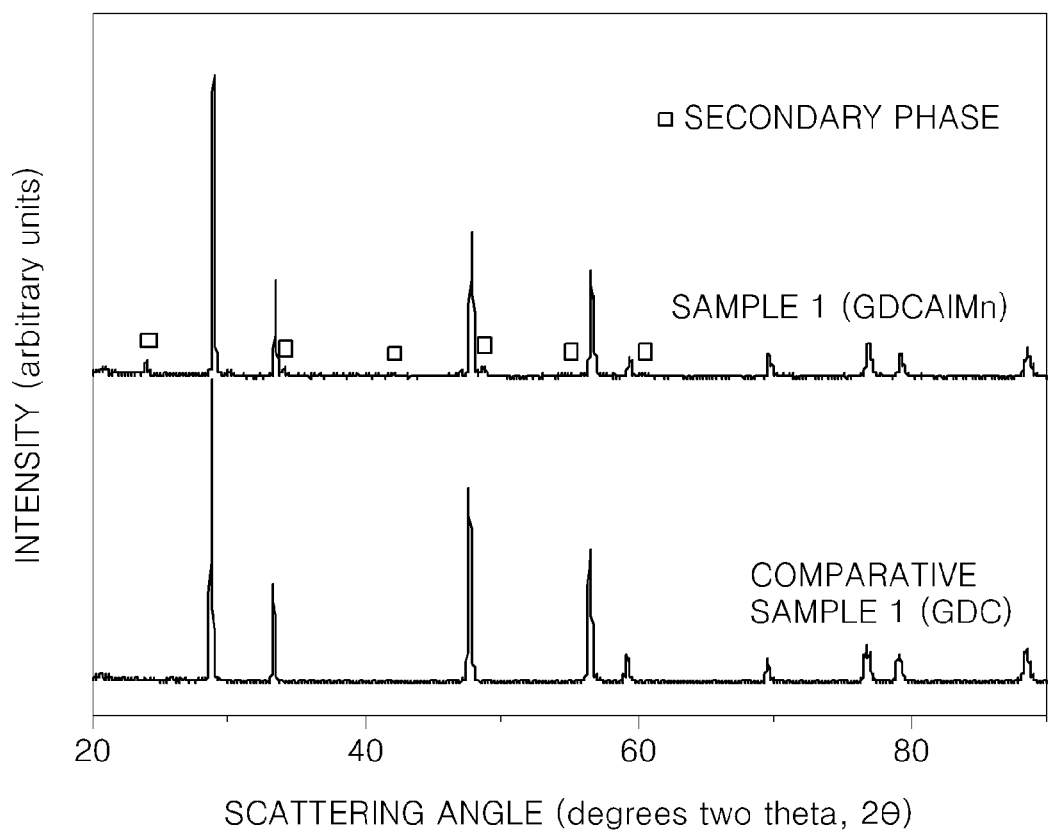
FIG. 3 is a graph of intensity (arbitrary units) versus scattering angle (degrees two theta) which shows X-ray diffraction test results of sintered products prepared according to Example 1 and Comparative Example 1.

An X-ray diffraction analysis was performed on Sample 1 and Comparative Sample 1 and the results are shown in FIG. 3. Referring to FIG. 3, in the XRD spectra, Comparative Sample 1, which comprises GDC has a single phase, and Sample 1, which comprises GDCAlMn has a secondary phase. The secondary phase is present due to GdAlO$_3$ having a perovskite structure. Because a manganese oxide peak related to manganese is not present, it can be seen that manganese is doped into GDC or GdAlO$_3$.

Scanning Electron Microscope ("SEM") Analysis

A fine structure of Sample 1 and Comparative Sample 1 was identified by SEM analysis, and the results are shown in the photographs of FIG. 4.

Referring to FIG. 4, like the XRD test results, Comparative Sample 1 (GDC) has a single phase, and Sample 1 (GDCAlMn) has a secondary phase at the grain boundaries. From the photographs of the fine structure of Sample 1, it was identified that Sample 1 has a dense structure. A relative density of Sample 1 was 90% or more.

Electric Conductivity Evaluation

Electric conductivity of Sample 1 and Comparative Sample 1 was measured by using a 2-probe AC-conductivity evaluation method. An electrode was formed using Au-paste and the electrode was heat treated at a temperature of 700° C. for 1 hour in air. The evaluation equipment used was a Material Mates 7260, which is an impedance analyzer, and the evaluation frequency range was 10 MHz to 1 Hz, and the amplitude was 50 mA. The evaluation of impedence was performed using two electrodes at both ends of a specimen and an alternative current in an air atmosphere and in a reducing environment of H$_2$ (7.5 volume %)/N$_2$ (92.5 volume %). The electric conductivity can be calculated using the measured resistance considering the size of the sepcimen. Impedance evaluation results of Comparative Sample 1 (GDC) are shown in FIG. 5 (air atmosphere) and FIG. 6 (the reducing environment).

Figure 5:
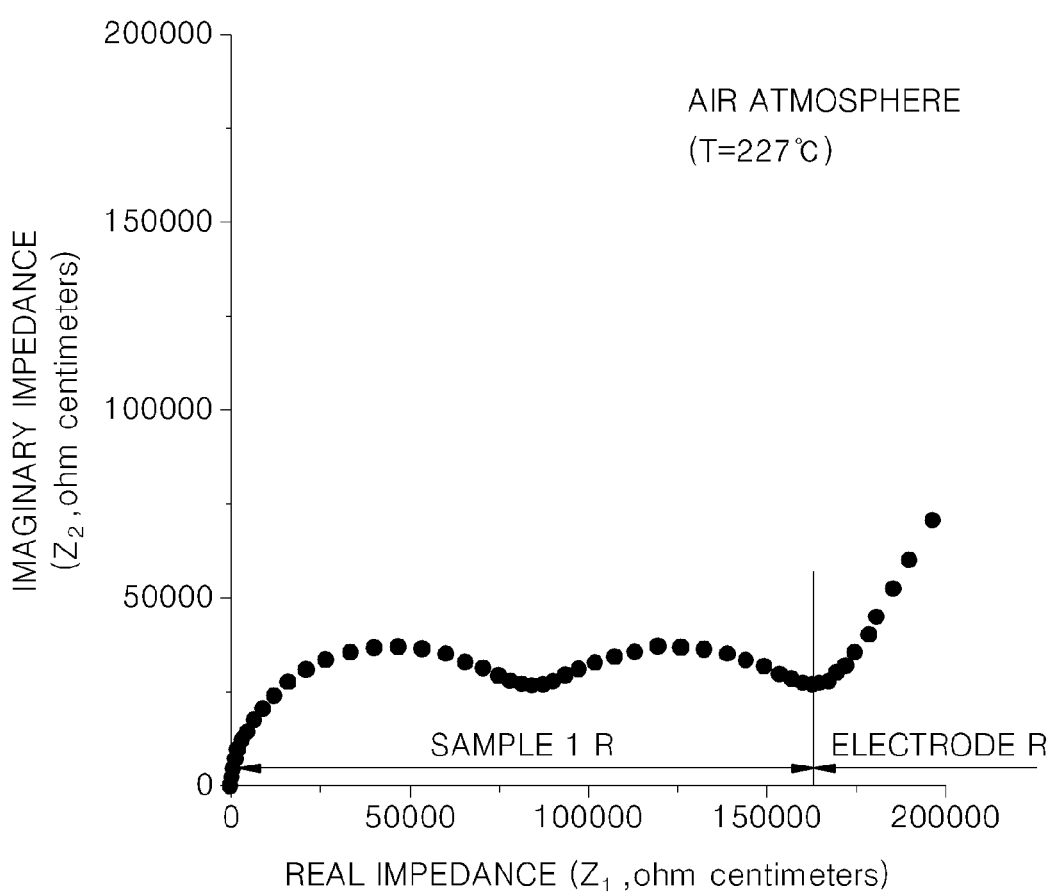
FIG. 5 is a graph of imaginary impedance ($Z_2$, ohm centimeters, ohm·cm) versus real impedance ($Z_1$, ohm centimeters, ohm·cm) which shows impedance test results of a sample prepared according to Comparative Example 1 (GDC) in an air atmosphere.
Figure 6:
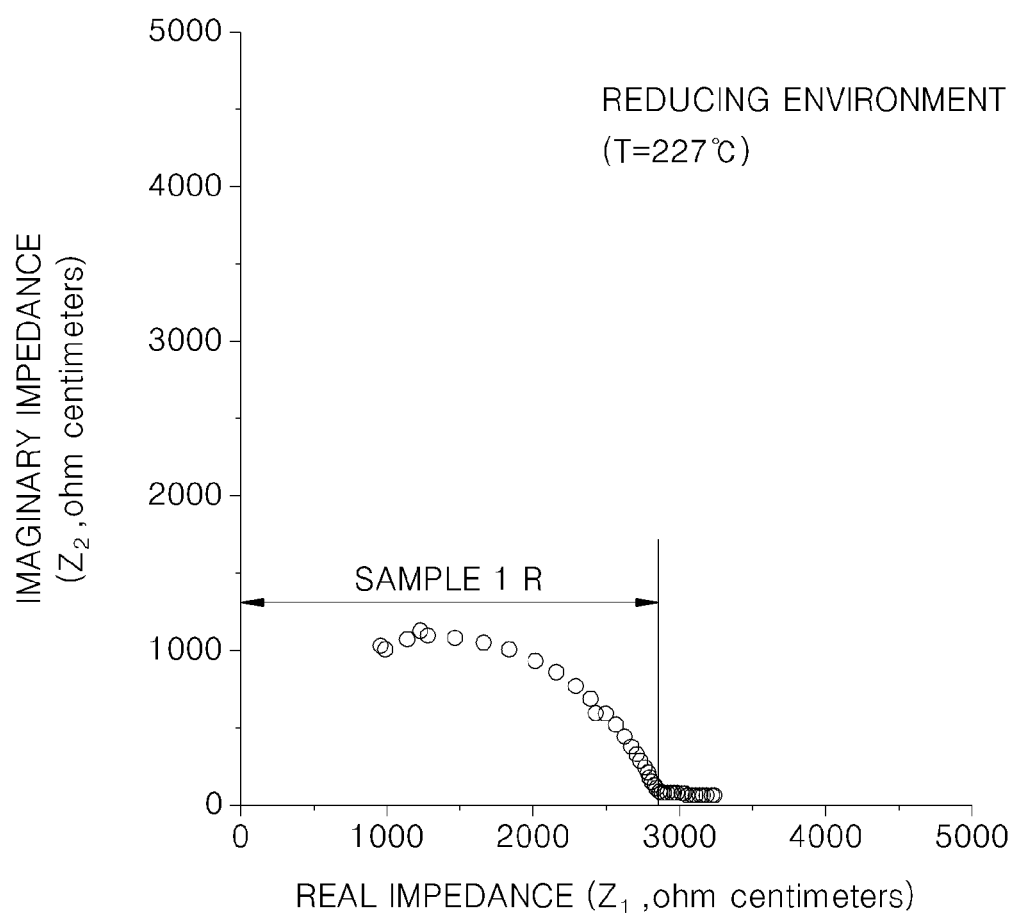
FIG. 6 is a graph of imaginary impedance ($Z_2$, ohm centimeters, ohm·cm) versus real impedance ($Z_1$, ohm centimeters, ohm·cm), which shows impedance test results of a sample prepared according to Comparative Example 1 (GDC) in a reducing environment.

Referring to FIG. 5, a specific resistance of Comparative Sample 1 at a temperature of 277° C. in an air atmosphere is about 150,000 ohm·cm. In this regard, while not wanting to be bound by theory, it believed that a left most semicircle of the impedance plot is related to a specific resistance of grains and a right semicircle is related to a specific resistance of a grain boundary. The specific resistance of Comparative Sample 1 is the sum of the specific resistance of grains and the specific resistance of a grain boundary. A curve of an electrode R represents the specific resistance of the electrode. In an air atmosphere, the specific resistance is determined by the ionic conductivity of a sample. However, referring to FIG. 6, in a reducing environment, the specific resistance of Comparative Sample 1 is substantially decreased to about 3,000 ohm·cm. Specifically, the conductivity was substantially increased. While not wanting to be bound by theory, it believed that this is because the electronic conduction is increased due to generation of electrons by reducing Ce$^{4+}$ into Ce$^{3+}$. As described above, a substantial increase in electronic conduction in a reducing environment leads to a decrease in the performance of a fuel cell.

Figure 7:
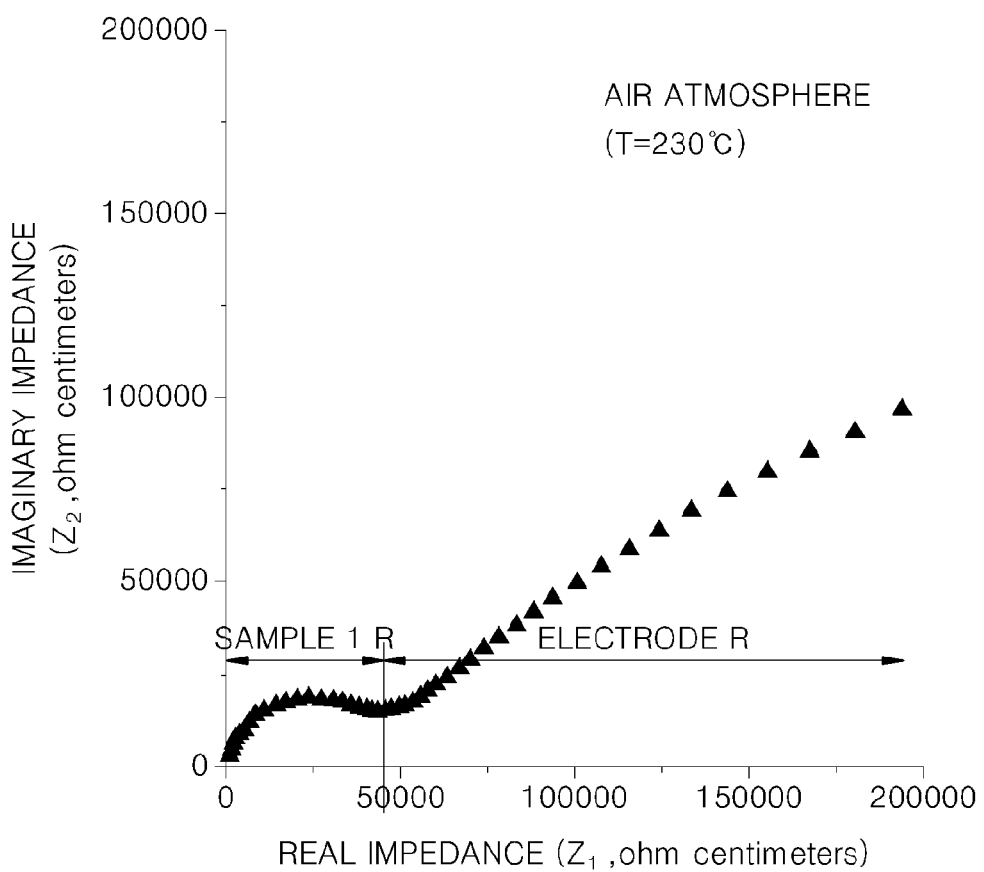
FIG. 7 is a graph of imaginary impedance ($Z_2$, ohm centimeters, ohm·cm) versus real impedance ($Z_1$, ohm centimeters, ohm·cm), which shows impedance test results of a sample of 97 weight % of $Ce_{0.8}Gd_{0.2}O_2$, 2 weight % of $Al_2O_3$, and 1 weight % of $Mn_2O_3$ ("GDCAlMn") prepared according to Example 1 (GDCAlMn) in an air atmosphere.
Figure 8:
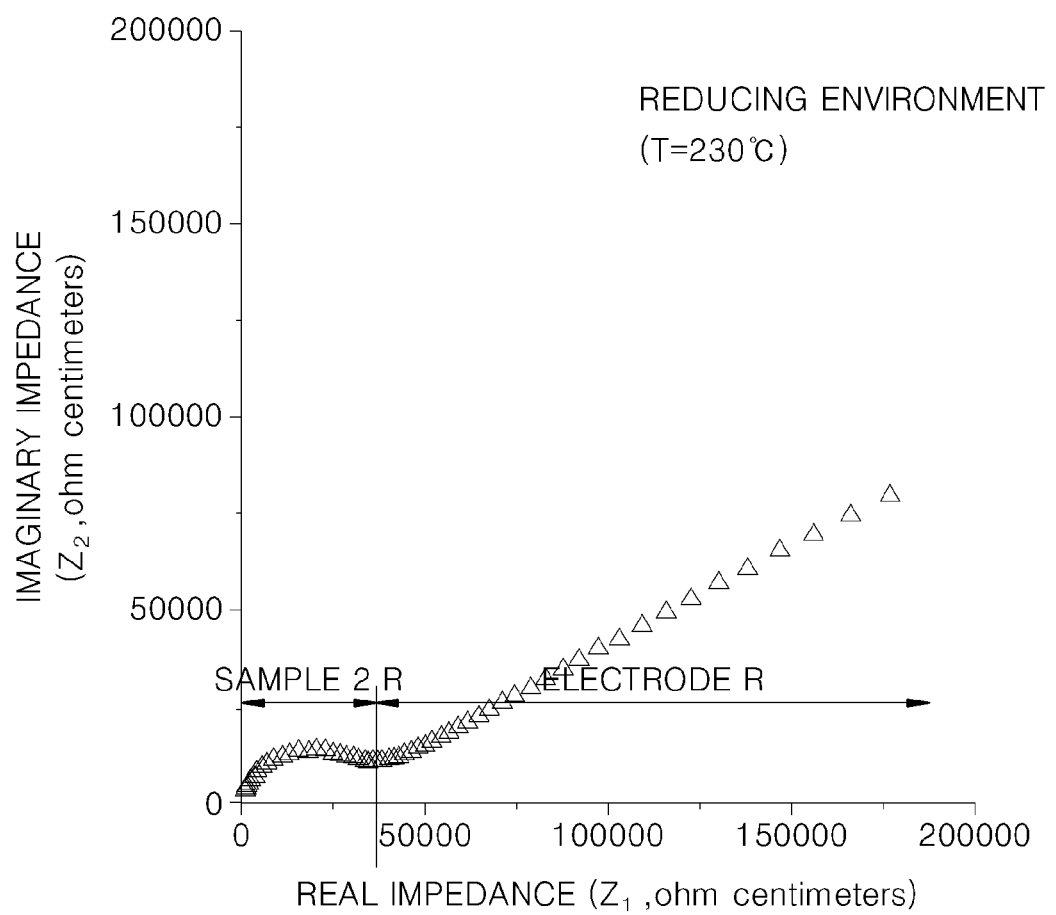
FIG. 8 is a graph of imaginary impedance ($Z_2$, ohm centimeters, ohm·cm) versus real impedance ($Z_1$, ohm centimeters, ohm·cm), which shows impedance test results of a sample prepared according to Example 1 (GDCAlMn) in a reducing environment.

Impedance evaluation results of Sample 1 (GDCAlMn) in the same conditions as described above are shown in FIG. 7 (air atmosphere) and FIG. 8 (in a reducing environment). The specific resistance of Sample 1 at a temperature of 230° C. and in an air atmosphere is about 45,000 ohm·cm. Even in a reducing environment, Sample 1 has a similar specific resistance of about 35,000 ohm·cm. While not wanting to be bound by theory, it believed that this is because electronic conduction was suppressed and ionic conductivity remained as a dominant charge carrying mechanism even in a reducing environment.

Figure 9:
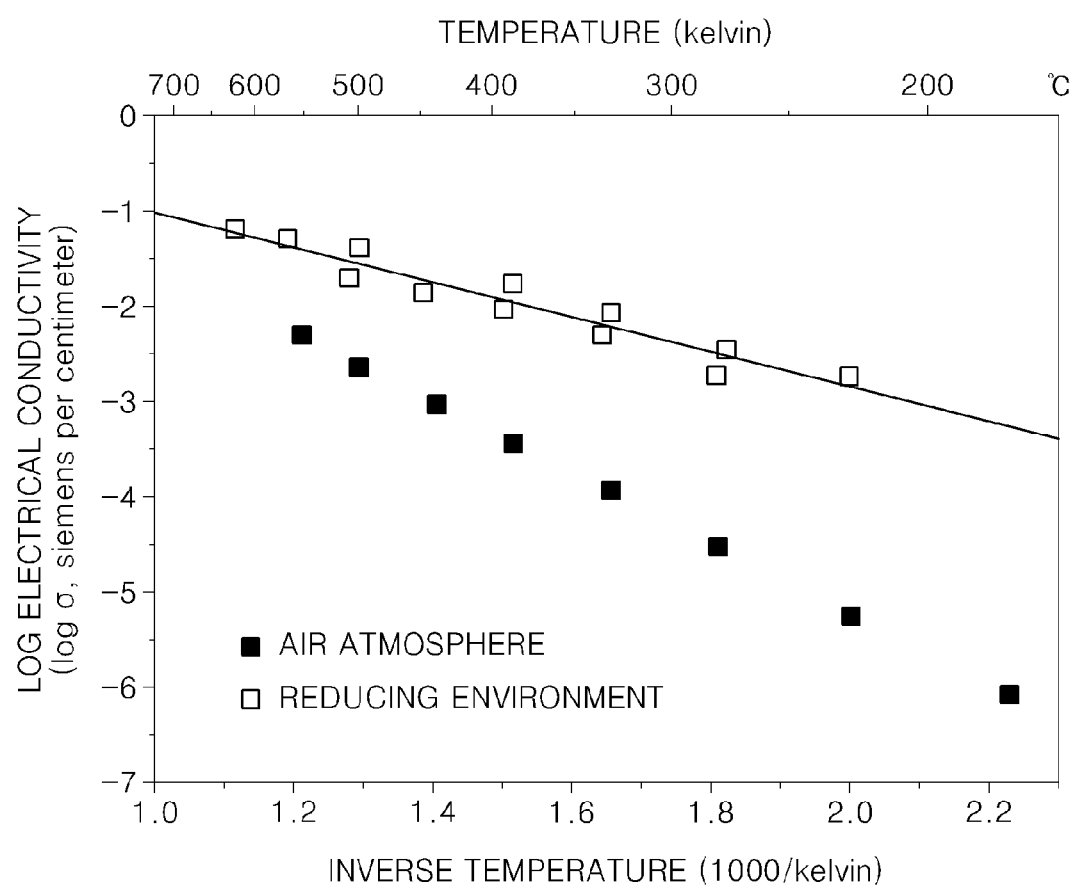
FIG. 9 is a graph of log electronic conductivity (log $\sigma$, siemens per centimeter, $Scm^{-1}$) with respect to temperature (Kelvin) and inverse temperature (1000/Kelvin) of a sample prepared according to Comparative Example 1.
Figure 10:
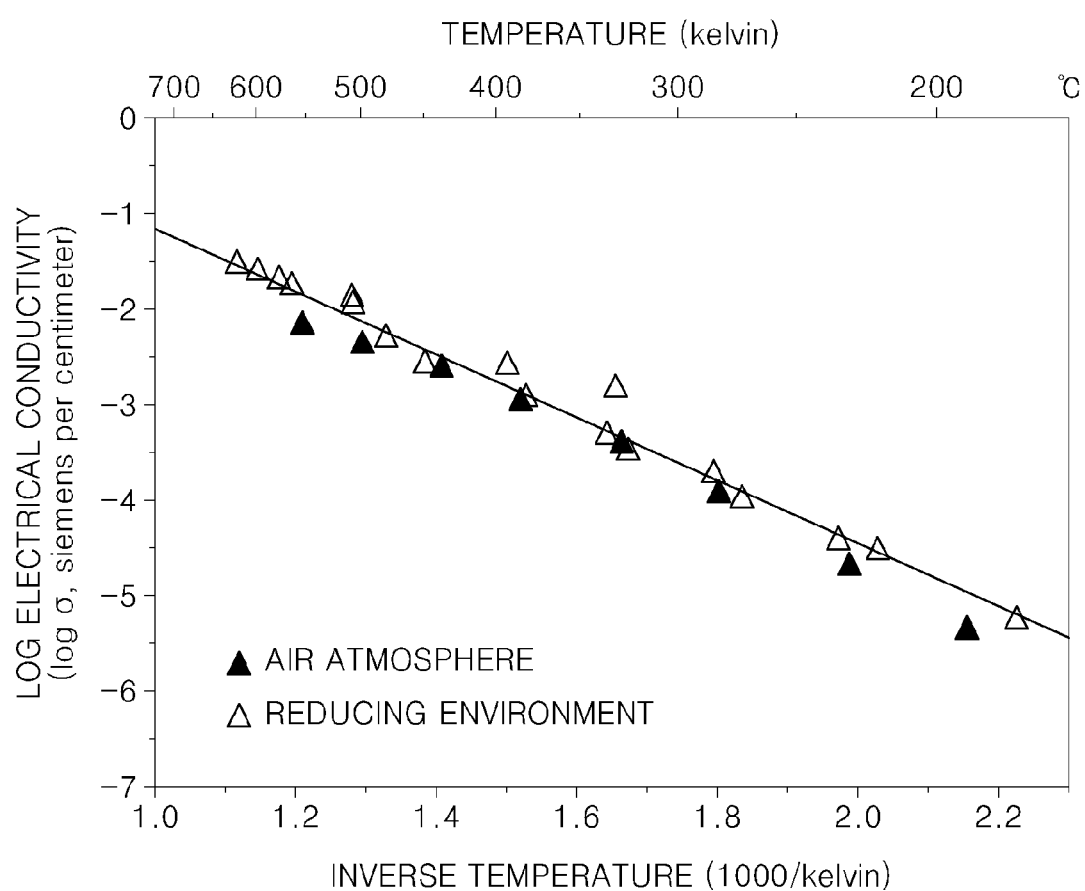
FIG. 10 is a graph of log electronic conductivity (siemens per centimeter) with respect to temperature (Kelvin) and inverse temperature (1000/Kelvin) of a sample prepared according to Example 1.

Based on the impedance patterns of Comparative Sample 1 and Sample 1 evaluated in an air atmosphere and in a reducing environment, conductivity with respect to temperature of Comparative Sample 1 and Sample 1 is shown in FIGS. 9 and 10, respectively. As shown in the impedance patterns, in the case of Comparative Sample 1 (GDC), conductivity in an air atmosphere is very different from that in a reducing environment (see FIG. 9). On the other hand, in the case of Sample 1 (GDCAlMn), conductivity in an air atmosphere is very similar to that in a reducing environment (see FIG. 10). The latter means that even in a reducing environment, the ionic conduction is a dominant charge carrier, thus even in a reducing environment, the ionic transference number is near 1 and the OCV has a theoretical or near theoretical value.

Figure 11:
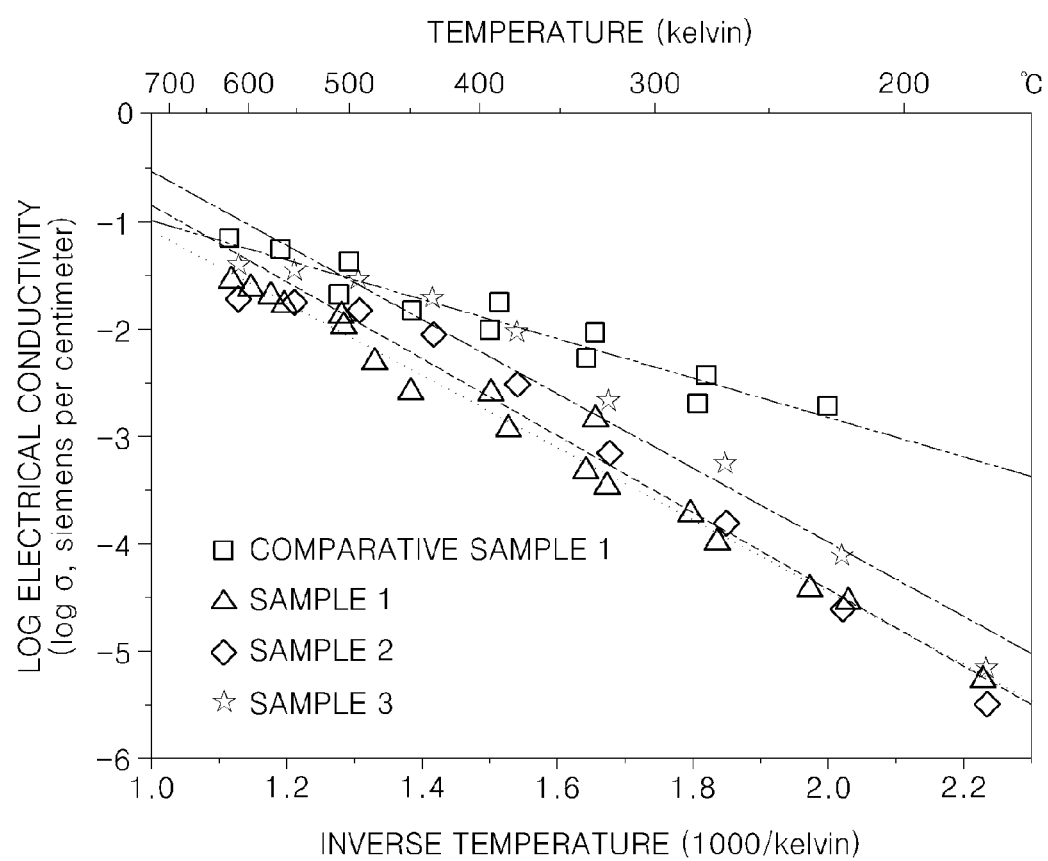
FIG. 11 is a graph of log electronic conductivity (siemens per centimeter) versus temperature (Kelvin) and inverse temperature (1000/Kelvin) of samples prepared according to Comparative Example 1 (GDC), Example 1 (GDCAlMn), Example 2 (97 weight % of $Ce_{0.8}Gd_{0.2}O_2$, 2 weight % of $Al_2O_3$, and 1 weight % of $Fe_2O_3$, "GDCAlFe"), and Example 3 (97 weight % of $Ce_{0.8}Gd_{0.2}O_2$, 2 weight % of $Al_2O_3$, and 1 weight % of CuO, "GDCAlCu") in a reducing environment.

FIG. 11 is a graph of conductivity of Comparative Sample 1 (GDC), Sample 1 (GDCAlMn), Sample 2 (GDCAlFe), and Sample 3 (GDCAlCu) in a reducing environment. Referring to FIG. 11, conductivity of Comparative Sample 1 is substantially lower than those of Samples 1 through 3.

Hardness Test

Figure 12:
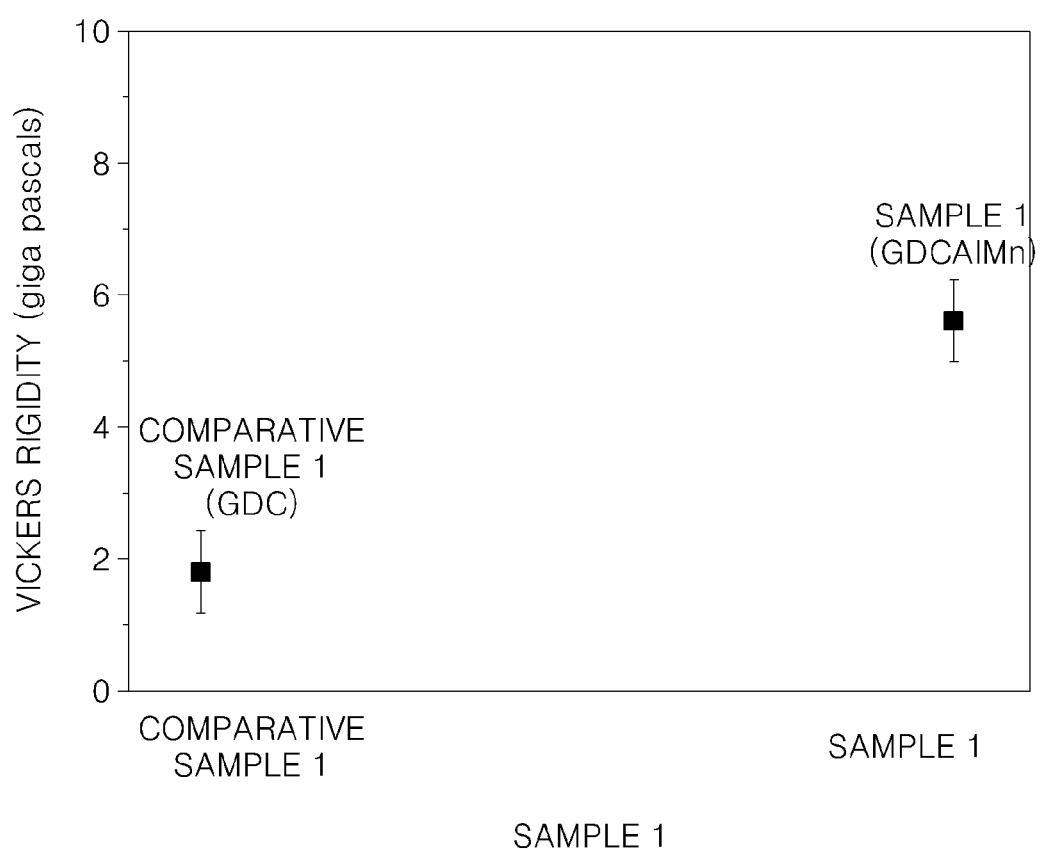
FIG. 12 is a graph of Vickers Hardness (gigaPascals, GPa) versus sample, which shows Vickers hardness test results of a GDC sample prepared according to Comparative Example 1 (GDC) and a sample of GDCAlMn prepared according to Example 1.

Vickers hardness tests were performed according to a KS test method. The measurement equipment used was a Vickers microhardness tester. A specimen was pressed by using a pyramid-shaped diamond indenter to form a pyramid-shaped pit in the specimen, and then the applied weight was removed. Hardness was calculated by dividing the applied weight by a surface area of the permanent pit. In this case, the applied weight was 1 kgf, a surface area of GDC was $5.502*10^{-3}$ mm$^2$, and a surface area of GDCAlMn was $1.758*10^{-3}$ mm$^2$. The vickers hardness test results are shown in FIG. 12. Referring to FIG. 12, the hardness of Sample 1 (GDCAlMn) prepared by adding Al$_2$O$_3$, i.e., a strength reinforcing compound, to the doped ceria compound (GDCAlMn) is about 2.5 GPa higher than Comparative Sample 1 (GDC) including only the ceria compound.

As disclosed above, according to an embodiment, a solid oxide electrolyte has high ionic conductivity and electric conduction therein is hindered. Thus, a fuel cell including the solid oxide electrolyte has improved power-generation efficiency and good mechanical properties.

It should be understood that the exemplary embodiments described herein should be considered in a descriptive sense only and not for purposes of limitation. Descriptions of features, advantages, or aspects within each embodiment should be considered as available for other similar features or aspects in other embodiments.

What is claimed is:

1. A solid oxide electrolyte layer for a solid oxide fuel cell comprising a solid oxide electrolyte, the solid oxide electrolyte comprising:

an oxide represented by Formula 1

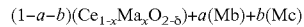

$(1-a-b)(Ce_{1-x}Ma_xO_{2-\delta})+a(Mb)+b(Mc)$  Formula 1 wherein

0<a<0.2, 0<b<0.2, 0<x<0.5, δ is selected so that the Ce$_{1-x}$Ma$_x$O$_{2-\delta}$ is electrically neutral, Ma is a rare-earth metal, Mb comprises at least one of Al$_2$O$_3$, SiO$_2$, MgO, TiO$_2$, AlN, SiC, or Si$_3$N$_4$, Mc is at least one of Mn$_2$O$_3$, MnO, Fe$_2$O$_3$, FeO, Cu$_2$O$_3$, CuO, or Co$_2$O$_3$, and wherein the solid oxide electrolyte layer is a component of the solid oxide fuel cell.

2. The solid oxide electrolyte of claim 1, wherein Ma comprises at least one of gadolinium, yttrium, scandium, ytterbium, samarium, lutetium, dysprosium, lanthanum, or praseodymium.

3. The solid oxide electrolyte of claim 1, wherein 0<a<0.1, 0<b<0.1, and 0<x<0.3.

4. The solid oxide electrolyte of claim 1, wherein 0.005<a<0.07, 0.005<b<0.07, and 0.10<x<0.25.

5. The solid oxide electrolyte of claim 1, wherein 0.007<a<0.05, 0.007<b<0.05, and 0.15<x<0.23.

6. The solid oxide electrolyte of claim 1, wherein the oxide of Formula 1 is represented by Formula 2:

$$(1-a-b)(Ce_{1-x}Gd_xO_{2-\delta})+a(Al_2O_3)+b(Mc) \quad \text{Formula 2}$$

wherein
Mc is $Mn_2O_3$, CuO, or $Fe_2O_3$,
$0<a<0.1$, $0<b<0.1$, $0<x<0.3$, and
$\delta$ is selected so that the $Ce_{1-x}Gd_xO_{2-\delta}$ is electrically neutral.

7. The solid oxide electrolyte of claim 6, wherein $0.005<a<0.07$, $0.005<b<0.07$, and $0.10<x<0.25$.

8. The solid oxide electrolyte of claim 6, wherein $0.007<a<0.05$, $0.007<b<0.05$, and $0.15<x<0.23$.

9. A solid oxide fuel cell comprising:
an air electrode,
a fuel electrode; and
the solid oxide electrolyte of claim 1 interposed between the air electrode and the fuel electrode.

10. A method of preparing a solid oxide electrolyte layer for a solid oxide fuel cell, the method comprising:
contacting a cerium precursor, a precursor of Mb, a precursor of Mc, and a solvent to prepare a precursor composition;
spraying the precursor composition; and
calcining the sprayed precursor composition in an oxygen atmosphere to prepare the solid oxide electrolyte of claim 1,
wherein
Mb comprises at least one of $Al_2O_3$, $SiO_2$, MgO, $TiO_2$, AlN, SiC, or $Si_3N_4$, and
Mc is at least one of $Mn_2O_3$, MnO, $Fe_2O_3$, FeO, $Cu_2O_3$, CuO, or $Co_2O_3$.

11. The method of claim 10, further comprising sintering the calcined precursor composition to obtain a sintered product.

12. The method of claim 10, wherein
the cerium precursor is a cerium nitrate,
the precursor of Mb is a nitrate of aluminum, silicon, magnesium, or titanium, or a combination comprising at least one of the foregoing, and
the precursor of Mc is a nitrate of manganese, iron, copper or cobalt.

13. The method of claim 10, wherein the precursor composition is further contacted with a precursor of a rare-earth metal.

14. The method of claim 13, wherein the rare-earth metal comprises at least one of Gd, Y, Sc, Yb, Sm Lu, Dy, La, or Pr.

15. The method of claim 13, wherein the precursor of the rare-earth metal is a nitrate of the rare-earth metal.

* * * * *